Jan. 15, 1924.  1,481,196
W. F. GODAR ET AL
HEADLIGHT SHIFTING MECHANISM FOR MOTOR VEHICLES
Filed March 23, 1923
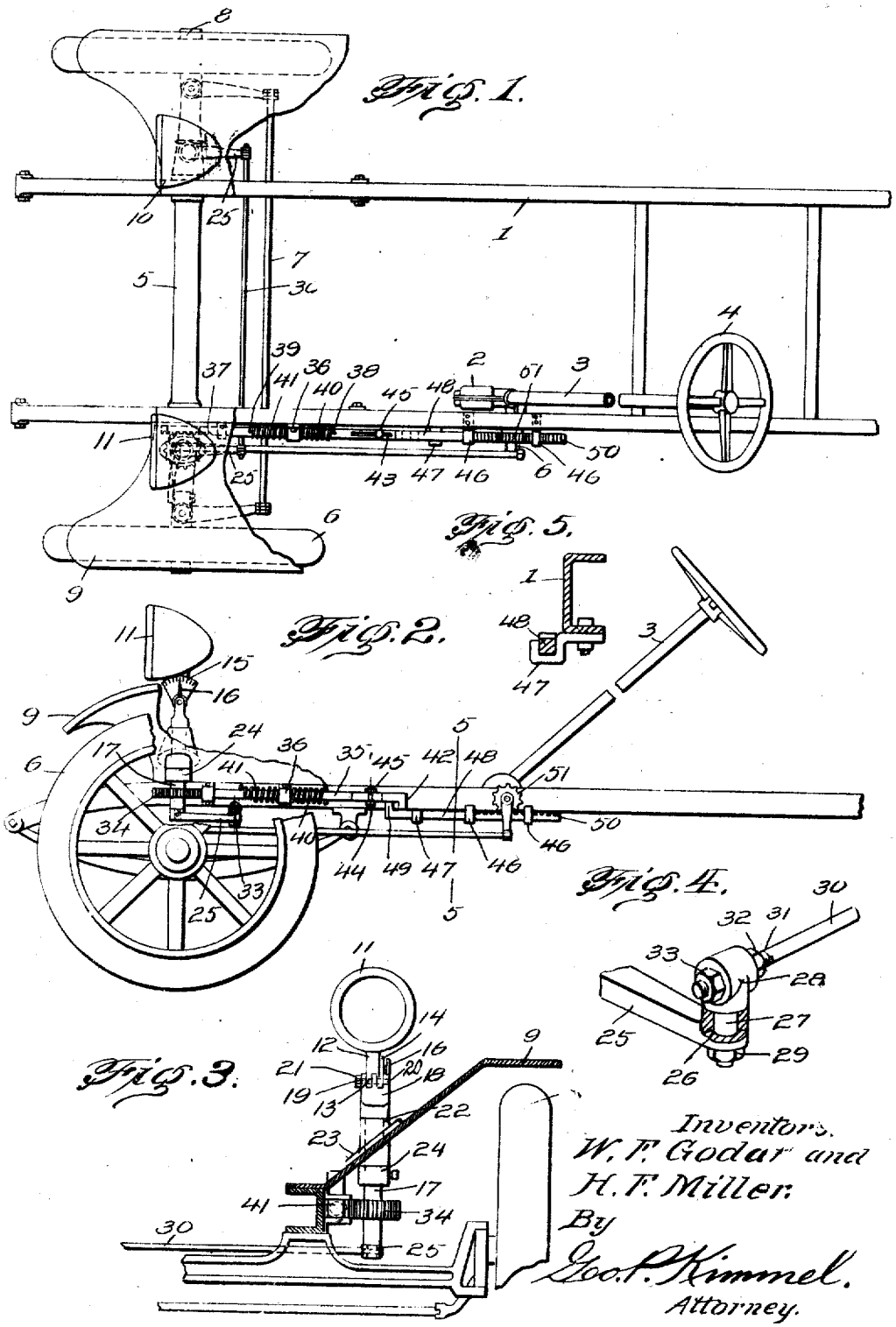
Inventors.
W. F. Godar and
H. F. Miller.
By
Geo. F. Kimmel,
Attorney.

Patented Jan. 15, 1924.

1,481,196

UNITED STATES PATENT OFFICE.

WILLIAM F. GODAR AND HENRY F. MILLER, OF ST. LOUIS, MISSOURI.

HEADLIGHT-SHIFTING MECHANISM FOR MOTOR VEHICLES.

Application filed March 23, 1923. Serial No. 627,101.

*To all whom it may concern:*

Be it known that we, WILLIAM F. GODAR and HENRY F. MILLER, citizens of the United States, residing in St. Louis city, Missouri, have invented certain new and useful Improvements in Headlight-Shifting Mechanism for Motor Vehicles, of which the following is a specification.

This invention relates to a headlight shifting mechanism for motor vehicles, and has for its object to provide a mechanism of such class, in a manner as hereinafter referred to, with means operated from the steering gear of the vehicle for shifting the lamps or headlights thereof in unison synchronously with the steering operation, whereby the light rays from the lamps will be projected in the direction in which the vehicle is traveling, so that the light rays from the lamps will be directed in front of the vehicle when making turns and traveling around corners, to enable the operator to see what is directly in front of him, whether it be at a distance or close up.

A further object of the invention is to provide a headlight shifting mechanism, in a manner as hereinafter set forth, with means for adjusting the lamps so as to project the light rays at any angle from the ground up.

A further object of the invention is to provide a headlight shifting mechanism, in a manner as hereinafter referred to, with means whereby provision is had to prevent the shifting of the lamps under conditions when the steering mechanism is employed for the purpose of clearing ruts and other obstructions of a minor nature during the travel of the vehicle.

Further objects of the invention are to provide a headlight shifting mechanism which is simple in its construction and arrangement, readily installed, strong, durable, efficient in its use, operated simultaneously with and from the steering gear of a motor vehicle, and comparatively inexpensive.

With the foregoing and other objects in view, the invention consists of the novel construction, combination and arrangement of parts as hereinafter more specifically described and illustrated in the accompanying drawings, wherein is shown an embodiment of the invention, yet it is to be understood that changes, variations and modifications can be resorted to which come within the scope of the claims hereunto appended.

In the drawings wherein like reference characters denote corresponding parts throughout the several views:—

Figure 1 is a top plan view of a headlight shifting mechanism in accordance with this invention, and further showing the adaptation thereof in connection with the front fenders, chassis and steering gear of a motor vehicle.

Figure 2 is a side elevation of the headlight shifting mechanism, showing the adaptation thereof in connection with the chassis and steering gear of a motor vehicle.

Figure 3 is a fragmentary view in section, of a portion of a motor vehicle, showing the adaptation therewith of a headlight shifting mechanism in accordance with this invention.

Figure 4 is a fragmentary view, a perspective, illustrating the connecting means between the headlights or lamps of the vehicle.

Figure 5 is a section on line 5—5, Figure 2.

Referring to the drawings in detail, 1 denotes the chassis of a motor vehicle, 2 the vehicle steering gear, 3 the steering post, 4 the steering wheel, 5 the front axle, 6 the front wheels, 7 the connecting rod which is connected with the steering gear and with the knuckles of the axle spindles 8, and 9 indicates the front fenders. The foregoing elements are of known construction.

The lamps or headlights of the vehicle are indicated at 10 and 11, and each of which is provided with a depending stem 12, bifurcated at its lower end as at 13, and to one side of the stem 12, is secured a quadrant shaped plate 14, provided with graduations 15, having associated therewith a pointer 16.

Connected with each of the stems 12, in a manner to be presently referred to, is a vertically disposed lamp adjusting shaft 17 which has its upper end enlarged, as at 18, and bifurcated as at 19, for the reception of the bifurcated lower end of the stem 12. The enlarged upper end or head 18 of the shaft 17, has the pointer 16 formed integral therewith and so that the pointer 16 will oppose the graduations 15 on the plate 14. The bifurcated lower end 13, of the stem 12, is connected to the bifurcated portion 19, by a bolt 20, carrying a securing nut 21. The connection between the stem 12 and the shaft 17, is an adjustable one, as it enables the lamps to be positioned at any desirable angle with respect to the shaft 17, and by loosening the nut 21, the lamp can be moved to any desired inclination so that the light rays can be projected at any angle from the ground up. The desired inclination can be ascertained by the position of the graduations 15, with respect to the pointer 16.

Secured to, as well as extending through each of the front fenders 9, is a vertically disposed sleeve 22, provided intermediate its ends with a laterally projecting flange 23, which is seated upon and fixedly secured in any suitable manner to the upper face of the fenders 9. The enlarged upper end or head 18, of the shaft 16, is seated against the top of the sleeve 22. The lower portion of the shaft 17 carries a collar 24 which abuts against the lower edge of the sleeve 22, and the collar 24 in connection with the head 18, of the shaft 17, arrests vertical movement of the shaft 17, with respect to the fenders 9, and further constitutes means for connecting the shaft to the sleeve 22. The shaft 17 is shiftable in the sleeve 22 for the purpose of adjusting the lamps.

The lower end of each of the shafts 17, has fixed therewith, a rearwardly extending arm 25, formed with an opening 26, through which passes a threaded stem 27, which depends from a T-shaped coupling member 28. The lower end of the stem 27 carries a securing nut 29, which connects the member 28 and arm 25 together and the connection between the two is such, as to provide for a pivotal movement of the member 28 with respect to the rear end of the arm 25.

The arms 25 are connected together to provide for the shifting of the shafts 17 simultaneously so that the lamps carried by said shafts 17, will also be shifted in unison and the said mean consists of a connecting bar 30, threaded at each end, as at 31, and which is adjustably connected to the members 28 by the nuts 32, 33. The manner of setting up the bar 30, with respect to the arms 25, provides for adjustably connecting these latter with the bar 30, as is obvious.

One of the shafts 17, at a point removed from its associated arm 25, has secured thereto a pinion 34, which meshes with a spring controlled lengthwise shiftable toothed bar 35, slidably connected by the keepers 36 with the outer face of one of the side bars of the chassis 1. The teeth formed on the bar 35, are arranged at the forward end thereof and are indicated at 37. The forward end of the bar 35 is interposed between the pinion 34 and the chassis 1, as clearly shown in Figure 1. The bar 35 has secured therewith, a pair of pins 38, 39, which are spaced from each other and interposed between one of the keepers 36 and the pins 38, as well as surrounding the rod 35, is a coiled spring 40, and interposed between the said keeper 36 and the pin 39, as well as surrounding the rod 35 is a coiled spring 41. The functions of the springs 40, 41, are to return the rod 35 to normal position after the same has been shifted, in a manner to be presently referred to. The rod 35, at its rear end is formed with a depending short arm 42, and forwardly of said arm with a longitudinally extending slot 43, in which is arranged an adjustable abutment 44, in the form of a headed bolt carrying a securing nut 45. The head of the bolt is arranged below the rod 35 and impacted by an actuating member, to be presently referred to, for the purpose of shifting the rod 35 forwardly. The actuating member is also adapted to engage the arm 42 for the purpose of shifting the rod 35 rearwardly.

Slidably connected with the chassis 1, by the keepers 46, and supported in the bearing 47, is an actuating member consisting of a bar 48, having its forward end provided with an upwardly extending short arm 49, which cooperates with the arm 42 for shifting the rod 35 rearwardly, and which further cooperates with the abutment 44 for the purpose of shifting the rod 35 forwardly. The keepers 46 and the bearing 47 are secured to that side of the chassis 1, to which the keepers 36 are connected. The rear end of the bar 48 is toothed, as at 50, and meshing therewith is a pinion 51, carried by the steering gear mechanism 2, and by this arrangement when the steering gear is shifted through the medium of the operation of the wheel 4, the pinion 51 is revolved and as it meshes with the teeth 50, the bar 48 will be shifted whereby the arm 49 will either impact with the abutment 44, or engage the arm 42, and shift the rod 35 whereby the lamps will be simultaneously shifted, so that the light rays will be projected in the direction in which the machine is steered.

The adjustable abutment 44, as well as the normal position of arm 42, which is spaced rearwardly from the arm 49, provides for the necessary amount of lost motion between the bar 48 and rod 35, whereby provision is had to prevent shifting of the lamps under conditions when the steering mechanism is employed for the purpose of clearing ruts and other obstructions of a minor nature, or in other words, the lamps are not shifted immediately at the start of operation of the steering gear although the bar 48 is, but the bar 48 shifts for a period independently of the moving of the rod 35, and by this arrangement the lamps are not shifted when the steering mechanism is employed for the purpose of clearing ruts or other obstructions.

Although the preferred embodiment of the headlight shifting mechanism in accordance with this invention, is as described and illustrated, yet it is to be understood that changes in the details of construction can be had without departing from the light of the invention as claimed.

What we claim is:—

1. A headlight shifting mechanism for motor vehicles comprising vertically disposed synchronously shiftable lamp supporting elements connected together, a pinion fixed to one of said elements, a slidably mounted spring controlled lengthwise shiftable toothed rod engaging with said pinion for actuating it to shift said elements synchronously, said rod having its rear terminal portion provided with a depending abutment and a depending arm spaced from each other, a slidably mounted toothed actuating member operated from the steering gear of the vehicle for shifting said rod forwardly or rearwardly, said member provided at its forward terminus with an upwardly extending arm interposed between said abutment and the arm of the rod and cooperating therewith to shift the rod, the arm of said member normally spaced from the arm and abutment of the rod, whereby the rod will be actuated after said member has been shifted a predetermined distance by the steering gear of the vehicle.

2. A headlight shifting mechanism for motor vehicles comprising vertically disposed synchronously shiftable lamp supporting elements connected together, a pinion carried by one of said elements, a slidably mounted spring controlled lengthwise shiftable rod provided with teeth at its forward terminus engaging with said pinion for actuating it to shift said element synchronously, said rod provided at its rear terminus with a depending arm and further in proximity to said arm with a lengthwise extending slot, an abutment element adjustably mounted in said slot depending from said rod and permanently spaced from said arm, and a slidably mounted actuating member toothed at its rear terminal portion for engagement with the steering mechanism of the vehicle to provide for the shifting of said member on the operation of said mechanism, said member having its forward terminus provided with an upwardly extending arm interposed between the abutment and arm of said rod and cooperating therewith for shifting the rod on the operation of said member, the arm of said member normally spaced from the arm and abutment of the rod whereby the rod will be actuated after said member has been shifted a predetermined distance.

In testimony whereof, we affix our signatures hereto.

WILLIAM F. GODAR.
HENRY F. MILLER.